May 11, 1948.  J. W. PFEIFFER  2,441,285
AUTOMATIC HITCH
Filed Dec. 13, 1945  2 Sheets-Sheet 1

Inventor
JOHN W. PFEIFFER

By Clarence A. O'Brien
and Harvey B. Jacobson
Attorneys

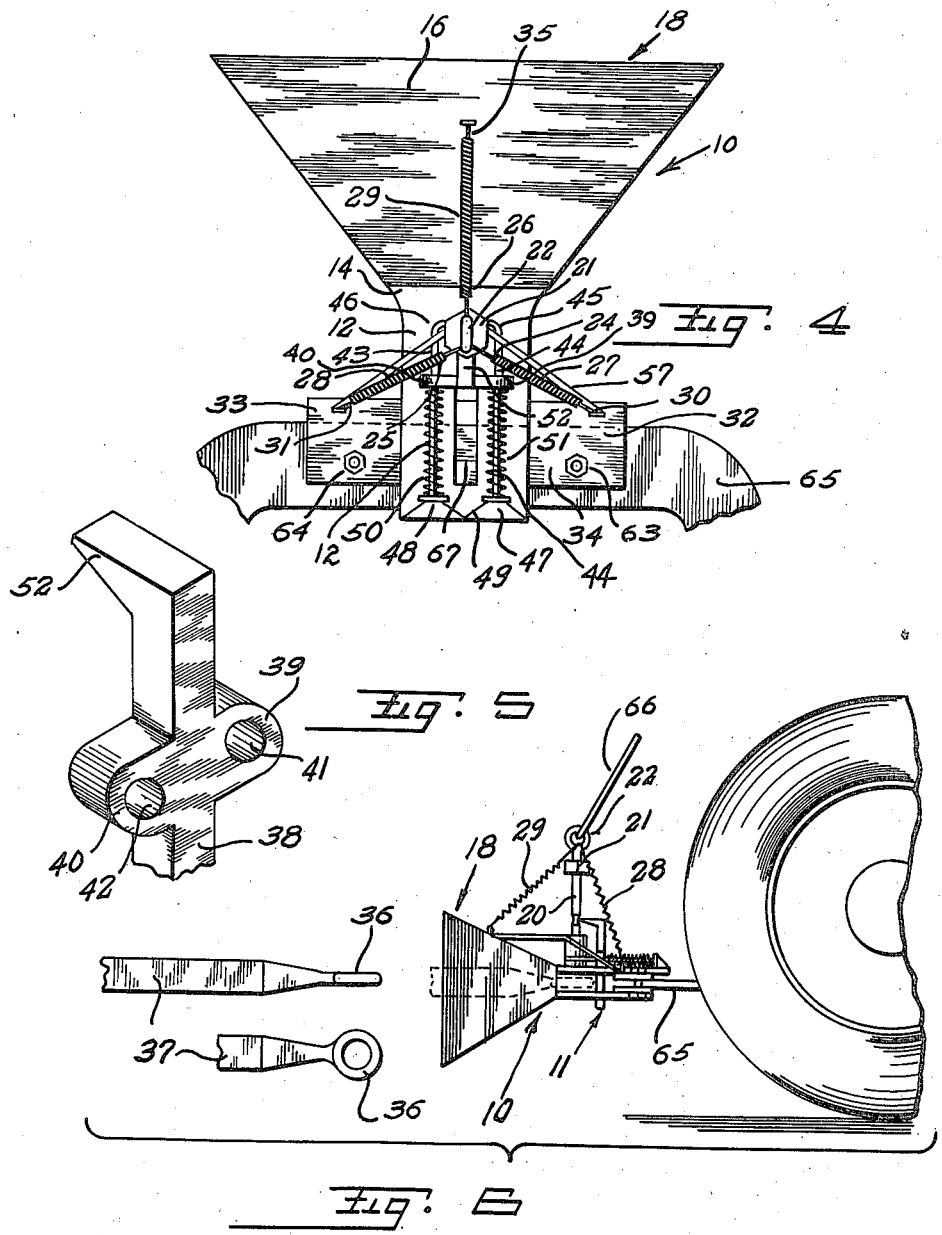

Patented May 11, 1948

2,441,285

UNITED STATES PATENT OFFICE 2,441,285

AUTOMATIC HITCH

John W. Pfeiffer, Red Oak, Iowa

Application December 13, 1945, Serial No. 634,734

1 Claim. (Cl. 280—33.15)

My invention as described herein, and illustrated in the accompanying drawings, consists of a vehicle hitch, an object of which is to provide a self operating hitch combination.

Another object of my invention is to provide a spring pulled hitch pin and means for holding the pin in raised position and adapted to be automatically released by a lap ring.

A further object of this invention is to provide in an automatic hitch a guide thereto.

Other features and advantages will become more readily apparent from the following description and the accompanying illustrative drawings in which:

Figure 4 is a top plan view of the device,

Figure 5 is a perspective view of a trip member, and

Figure 6 is a diagrammatic view of the hitch and a draw bar.

Figure 1:
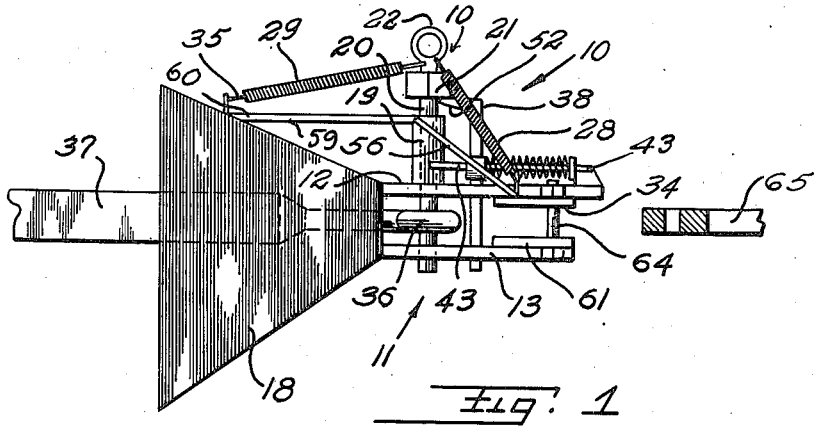
Figure 1 is a side elevational view of my hitch.
Figure 2:
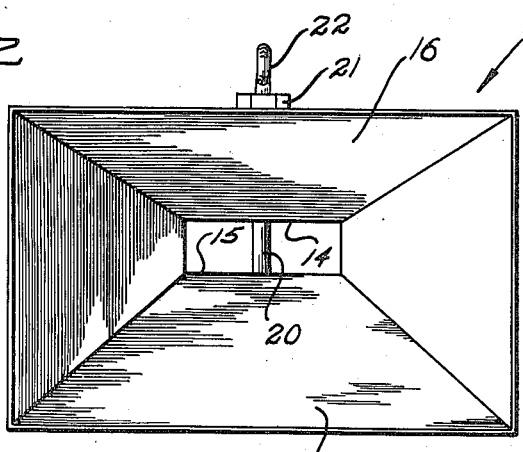
Figure 2 is an end view thereof.
Figure 3:
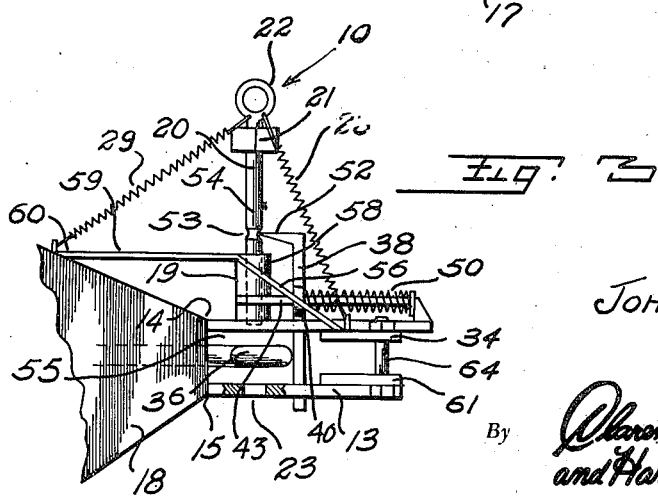
Figure 3 is an enlarged view of a trip mechanism.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my invention. And while I have stated the primary field of utility of my invention it remains obvious that it may be employed in any other capacity wherein it may be found applicable.

In the accompanying drawings, and in the following specification, the same reference characters are used to designate the same parts and elements throughout and in which 10, refers to my invention in its entirety and 11, indicates a supporting frame which consists of spaced plates 12 and 13, fixed to the reduced ends 14 and 15, of the upper and lower inclined walls 16 and 17, of a funnel-shaped guide 18.

Mounted upon the plate 12, adjacent said reduced ends is a vertical tubular guide 19, within which is slidably seated a hitch pin 20, having an enlarged head 21, above which is a ring 22, for engagement with a rope (not shown). The pin 20, is in alignment with a bore 23, in the lower plate 13. Attached to the head of pin 20, are the upper ends 24, 25 and 26 of pull springs 27, 28 and 29, the lower ends of the latter two being connected at 30 and 31, to the outer ends 32 and 33, of a rear cross plate 34, fixed to the under surface of plate 12. The lower end of spring 29, is fixed at 35, to the wall 16, of the guide 18. The action of these springs is to rapidly pull the pin 20, down into locking engagement with a lap ring 36, on the free end of a draw bar 37, which strikes the trip bar 38, releasing the pin, the ring 36, at the moment being lapped directly over the aperture 23, permitting the pin to pass through said ring and aperture whereby the said draw bar 37, will be secured to the hitch.

The bar 38, is provided with a pair of wings 39 and 40, through which are bores 41 and 42, through which pass track bars 43 and 44, the forward ends 45 and 46, of which are secured to the tube 19, and the rear ends 47 and 48, of which are secured to the upright terminal flange 49, of plate 12. Coiled upon each of said rods are springs 50 and 51, bearing between said end 49, and said wings, whereby the bar 38, is normally held forward with its right-angular end 52, engaging an annular notch or groove 53, in the central portion 54, of pin 20, whereby the pin may be held raised above the space 55, between the plates 12 and 13.

Braces 56 and 57, connect the plate 34, to the upper end 58, of tube 19, and a brace 59, is connected to said end 58, at one end and the other end 60, thereof is secured to wall 16. A transverse plate 61, fixed to the end 62, of plate 13, provides means through bolts 63 and 64, for securing the hitch to a bumper 65, or other part of a tractor or truck. The member 66, connected to eye 26, may be connected to a crank (not shown) whereby the pin 20, may be raised and automatically locked in locked raised position by the spring pressed trip 38. The plate 12, is provided with a longitudinal slot 67, through which the trip rod 38, operates.

The operation of the invention is as follows. A draw means is secured to the eye 22 for selective actuation of the resiliently biased locking pin. When said pin is raised, the spring loaded keeper 52 engages the groove 53 of said pin, thereby holding the same in raised position. Upon entry of the hook 36 into the guide 18, thence between spaced plates 12 and 13, the said keeper will be engaged, urging the same against the action of its associated springs. This operation releases the locking action of said keeper with said pin, allowing the same to be pulled through the hook 36. The keeper then engages the collar 21, prohibiting the springs 27, 28 and 29 from pulling said pin downward more than is desired.

Changes in shape, size and rearrangement of details and parts such as come within the purview of the invention claimed may be resorted to, in actual practice, if desired.

Having now described my invention that which I claim as new and desire to procure by Letters Patent is:

A coupling comprising a funnel shaped guide, spaced slotted plates extending from said guide, a sleeve secured to a selected plate, a pin slidably received in said sleeve, a groove and a collar on said pin, spring means secured to said pin for urging said pin through said sleeve and plates, a latch keeper floatingly received in the slots of said slotted plates, said keeper selectively engageable with said groove and collar, apertures in said keeper, perches secured to a selected plate, rods extending through said apertures and secured to said perches, resilient means on said rods for urging said keeper in a selected predetermined position.

JOHN W. PFEIFFER.

REFERENCES CITED

The following references are of record in the file of this patent:

UNITED STATES PATENTS

| Number | Name | Date |
|---|---|---|
| 1,649,980 | Schlagenhauf | Nov. 22, 1927 |
| 1,837,940 | Ade | Dec. 22, 1931 |